June 12, 1962 R. J. WEIDNER 3,039,030

DIGITAL TO ANALOGUE CONVERSION SERVOSYSTEM

Filed June 30, 1958 4 Sheets-Sheet 1

INVENTOR.
Ralph J. Weidner by Ralph R Barnard
ATTORNEY

June 12, 1962 R. J. WEIDNER 3,039,030

DIGITAL TO ANALOGUE CONVERSION SERVOSYSTEM

Filed June 30, 1958 4 Sheets-Sheet 2

June 12, 1962 R. J. WEIDNER 3,039,030

DIGITAL TO ANALOGUE CONVERSION SERVOSYSTEM

Filed June 30, 1958 4 Sheets-Sheet 3

3,039,030
DIGITAL TO ANALOGUE CONVERSION SERVOSYSTEM

Ralph J. Weidner, Endicott, N.Y., assignor to International Business Machines Corporation, New York, N.Y., a corporation of New York Filed June 30, 1958, Ser. No. 745,433
7 Claims. (Cl. 318—28)

Figure 1:
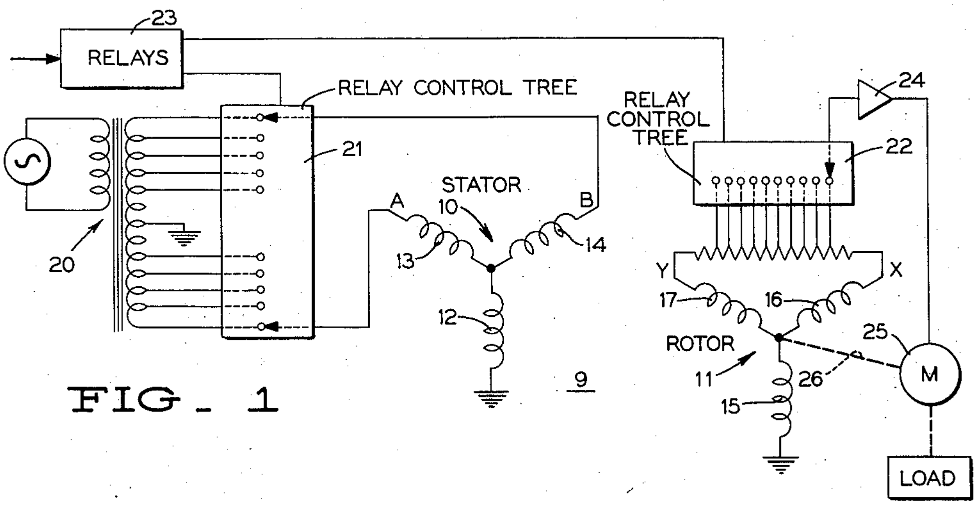

This invention relates to improvements in electromechanical systems and more particularly to a new and improved means for converting electrical digital information to a shaft position commensurate with the equivalent analog.

In the electromechanical and computer arts, it is often desired to take an electrical signal in digital form and position a shaft in accordance with the digital input quantity. Means for performing such a function should be as simple and economical as design permits commensurate with the resolution, accuracy and speed of operation which is required for the particular application. One system in the prior art for performing this function comprises a digital comparator for receiving a digital input, an electronic means for converting the output of the digital comparator to an analog voltage, a reversible electrical motor responsive to the analog voltage to position an output shaft in accordance therewith, and a digital code wheel positioned by the shaft in order to provide a digital follow-back signal to the digital comparator so that the output of the comparator is appropriately nulled whenever the output shaft is positioned in accordance with the digital input voltage. While such prior art means is adequate in many respects, it suffers from an important disadvantage resulting from the complicated circuitry required for the aforementioned requirements of a digital comparator and digital code wheel.

Moreover, whenever it is desired to obtain a high order of resolution in the digital-to-analog conversion, one or more additional digital code wheels or a single large diameter code wheel (depending on the order of resolution desired) are attached to the output shaft of the electric motor. As a practical matter, each of these wheels are required to rotate at increasingly high speed ratios for providing lower order digital pulse information to be compared in the comparator with corresponding digital information in the comparator. Problems arise, however, because the maximum rotational velocity at which digital code wheels work satisfactorily is limited unless the system is able to handle large moments of inertia of the code wheels.

Another means known in the prior art for performing the desired function comprises an independent plural-tapped transformer or potentiometer means for converting a digital input of several orders of significance (resolution) to an electrical analog voltage and for utilizing the resulting analog voltage to energize a conventional electromechanical position servo for conversion to the desired shaft position. In those electromechanical position servos utilizing potentiometers as follow-up devices, the resolution and noise level obtainable in the potentiometer are limiting factors in determining the accuracy that can be expected in converting the digital input of several orders of significance into a shaft position.

To avoid this limitation, techniques have been developed for utilizing a plural speed position servo with a separate input and follow-up device for each order of significance (or group of orders of significance) provided in the digital data input. Usually it is a practical requirement of such a system that each of the follow-up devices rotate at relative rotational velocities which are in an inverse proportion to the rotational velocity of the follow-up device of the highest order of significance or groups of orders of significance. Thus, a very high rotational velocity of operation may be required in one or more of the follow-up devices. Because of these high speeds and the resulting mechanical design problems, follow-up devices may not practicably be of the potentiometer or tapped transformer type. Only inductive devices, such as synchros or resolvers, can practically withstand the high rotational velocities without mechanical damage and provide a desirable high degree of resolution.

Unfortunately, as illustrated in the prior art, the use of non-linear inductive device in plural speed position servos, where a digital-to-analog shaft position conversion is desired, results in a marked increase in circuit complication along with a general incompatibility with relatively simple electrical interpolation techniques. The electromechanical design problems for high resolution digital-to-analog position conversion would be considerably simplified if a technique were known for economically utilizing non-linear inductive devices along with simple electrical interpolation techniques. This would be particularly true where it is desired to utilize the plural speed position servo approach. Broadly stated, considerable improvement is needed for providing high resolution, fast, relatively simple and economical equipment for providing a conversion of electrical digital information to a shaft position.

It should be understood that the techniques and problems described hereinabove, relating to the conversion of digital information to a shaft or angular position commensurate with its equivalent analog, are equally applicable to the conversion of digital information to a mechanical linear position commensurate with its equivalent analog.

It is, therefore, a primary object of the present invention to provide a new and improved means for converting electrical digital information to a mechanical position commensurate with its analog.

It is another object of the present invention to provide a new, improved, relatively simple and economical means for converting electrical digital information to a shaft position commensurate with its analog.

It is still another object of the present invention to provide a new, improved, relatively simple and high speed means for converting electrical digital information to a shaft position commensurate with its analog.

It is an additional object of the present invention to provide a new, improved, high resolution and relatively simple means for converting electrical digital information to a shaft position commensurate with its analog.

Other objects of the invention will be pointed out in the following description and claims and illustrated in the accompanying drawings which disclose, by way of examples, the principle of the invention and the best mode which has been contemplated of applying that principle.

Figure 4:
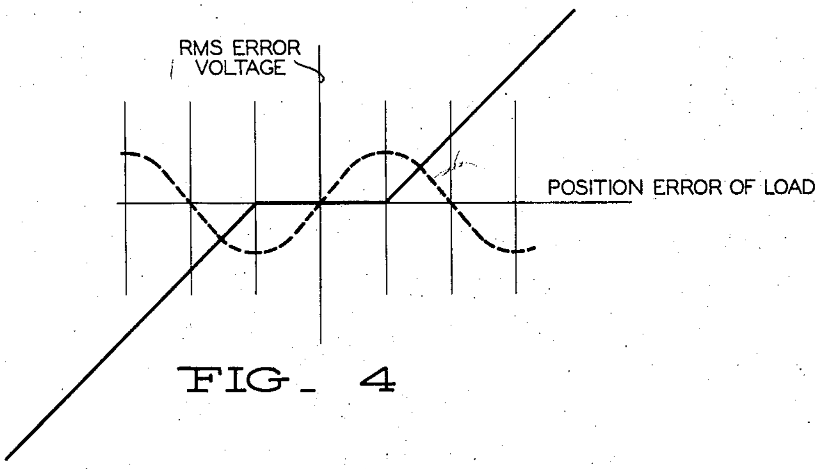
Figure 2:
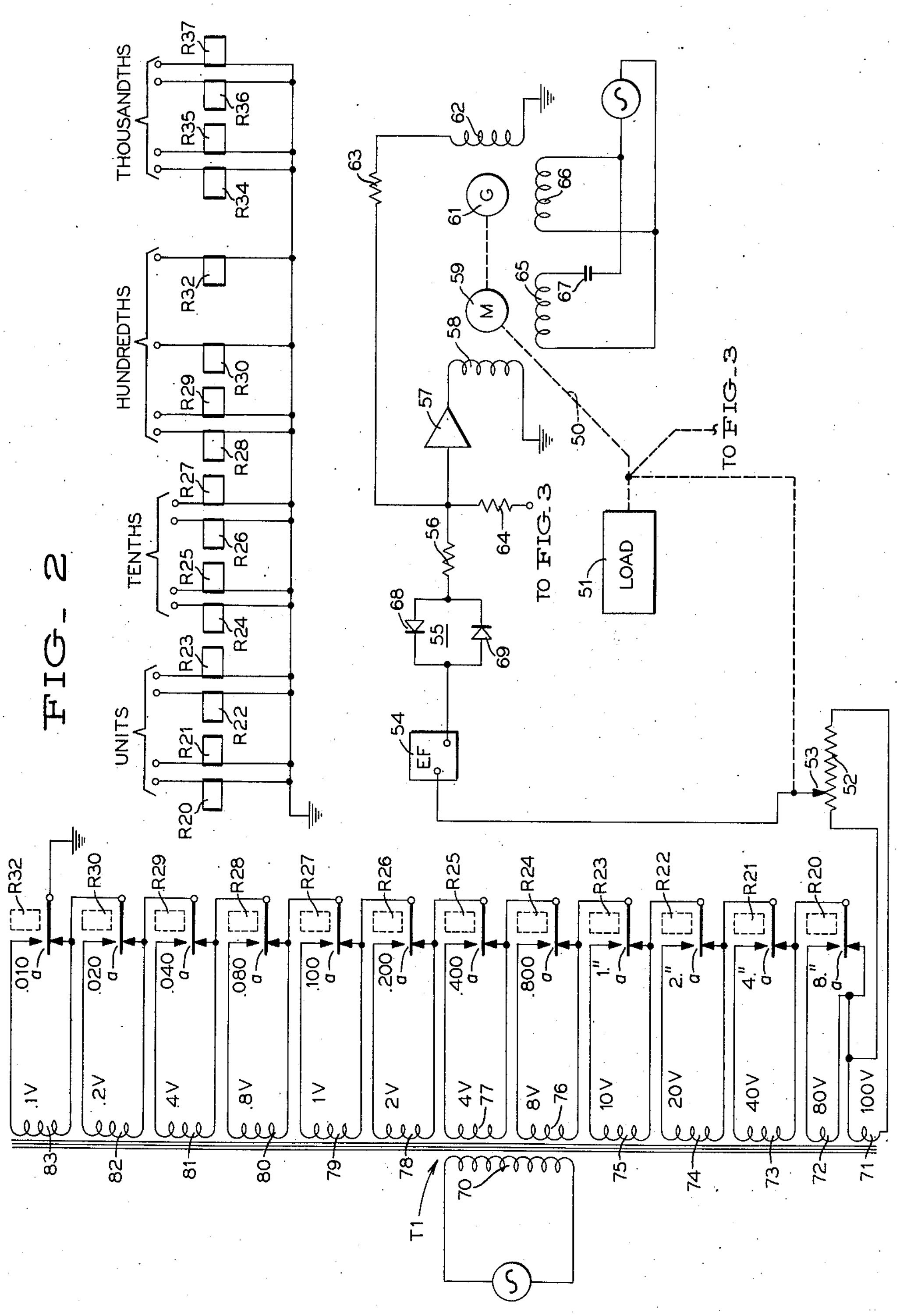
Figure 3:
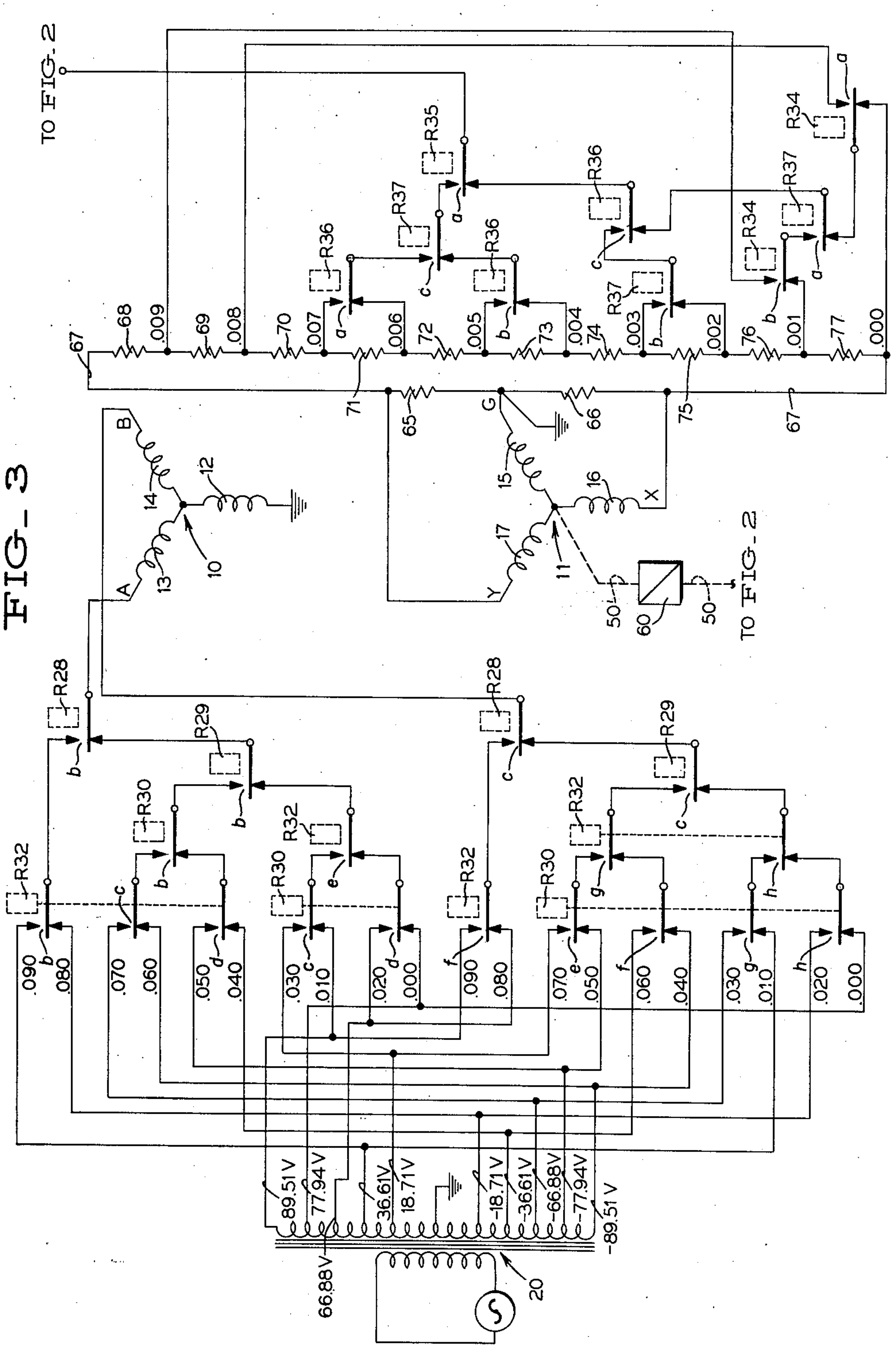
Figure 5:
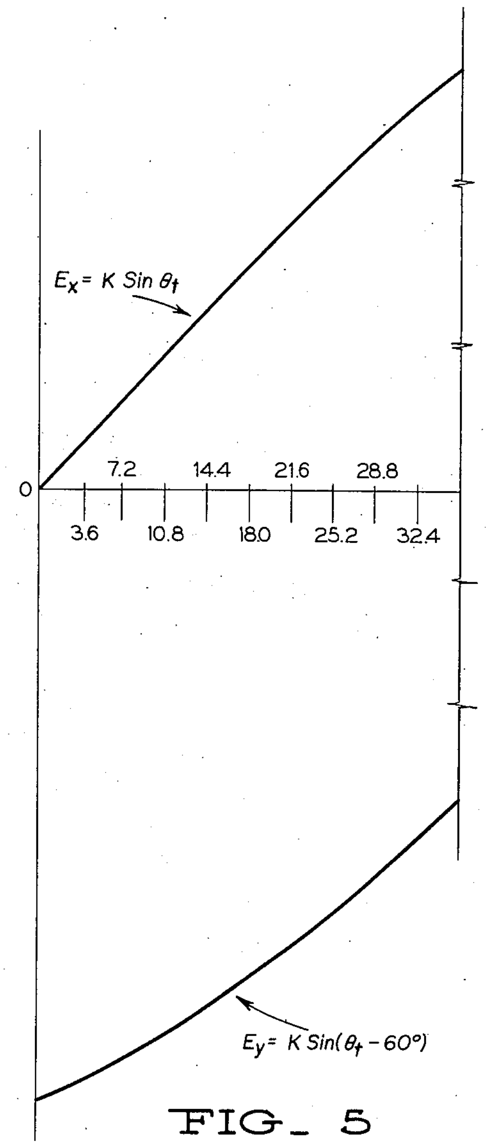

In the drawings:

FIG. 1 shows a simplified block diagram of applying relatively simple electrical interpolation techniques with a non-linear induction device according to the present invention;

FIGS. 2 and 3, taken together, illustrate the incorporation of a non-linear device utilizing a relatively simple electrical interpolation technique according to the present invention in a two-speed servo environment;

FIG. 4 is a plot of the electrical error input to the servo amplifier versus the linear position error of the load illustrating the utilization of the teachings of the present invention in a two-speed position servo environment; and FIG. 5 is an electrical waveform analysis of the voltages appearing across the low order selection means on the rotor of the induction device which will be helpful in understanding the present invention.

Whenever identical components are shown in more than one of the figures, they are indicated by identical reference numerals.

Briefly, the present invention teaches a new and improved means for converting electrical digital information to a mechanical position. Referring to FIG. 1, there is shown an inductive device which, by way of example, is illustrated as a synchro differential generator 9 comprising stator 10 and a rotor 11. Stator 10 has three Y-connected windings, 12, 13 and 14, angularly displaced by 120° in a conventional manner. Likewise, rotor 11 has three Y-connected windings, 15, 16 and 17, angularly displaced by 120°. One terminal of winding 12 is shown connected to ground, while terminals A and B of windings 13 and 14, respectively, are connected to the two outputs of a plural-tapped transformer 20 through relay contact tree 21. If relay contact tree 21 is connected to be responsive to the N order information of a digital input via a conversion means 21, the two outputs from plural-tapped transformer 20 may be energized such as to provide two analog voltages cooperating in magnitude and phase so as to electrically define a shaft position commensurate with the N order information of a digital input.

As a result, the stator windings cooperate to generate a resultant rotatable magnetic field in accordance with the shaft position analog of the N order digital input. If the rotor 11 is angularly positioned in appropriate correspondence with the resultant magnetic analog of the N order digital input, the instantaneous voltage between terminal X and ground of selected winding 16 will be zero. However, if the shaft angle and rotor are not in exact correspondence, this voltage will be other than zero, and it will be a trigonometric function of the angular difference therebetween. The voltage difference between terminal Y and ground will be zero if the rotor is rotated by 60° in the direction of the zero voltage of winding 16. A null will, therefore, be obtained at any desired intermediate angle of rotor 11 by connecting a multi-tap potentiometer 22 across terminals X and Y and taking the output from the selected tap. With rotor winding 15 being grounded as shown, a voltage will appear across terminals X and Y of rotor windings 16 and 17. A relay contact tree 23, responsive to the N–1 order information of the digital input converter 23, may be utilized for appropriately selecting a tap of potentiometer 22 in accordance therewith.

Furthermore, an amplifier 24 may be connected to be responsive to the selected tap such that a reversible motor 25 may be appropriately energized to position the rotor 11 via shaft 26 to null out the input voltage to amplifier 24. The position of shaft 26 will then correspond to the angle defined by the energization of the stator windings through relay contact tree 21, as modified by the action of relay contact tree 23 acting on the potentiometer 22.

As described, FIG. 1 discloses a technique where the many advantages of inductive type follow-up devices relating to their mechanical ability to withstand high rotational velocities during a portion of the operating time and at other times be available to provide a highly accurate electrical signal commensurate with the mechanical position of the rotor may be utilized. Furthermore, this technique has the additional feature of being compatible with relatively simple electrical interpolation techniques.

For example, the relay means 23 operates in cooperation with relay contact trees 21 and 22 in a conventional manner so as to provide for a coarse and vernier selection of an analog voltage commensurate with the instantaneous digital input information. However, the technique is improved by reason of the fact that the N order of digital input information determines the instantaneous electrical energization of the stator 10, while the N–1 order of digital input information to relay means 23 modifies the N order digital input information which is induced in the rotor 11 of the synchro differential by the voltages passing through the stator windings. If both the N order and N–1 order of digital input information were utilized to operate relay contact trees providing for the energization of the windings on stator 10, the circuitry and components required within the relay contact tree and plural tapped transformer would be very complex and difficult to manufacture.

The novelty and advantages of the present invention, as described in FIG. 1, may be best exemplified by utilizing them as the vernier control portion in combination with a conventional coarse digital-to-analog position conversion system. Referring now to FIGS. 2 and 3, suppose, by way of example, that it is desired to position a load 51 by the rotation of a shaft 50 through a conventional lead screw arrangement (not shown) with a resolution of .001 of an inch over a linear distance of .000–9.999 inches. A coarse-vernier two-speed servo system may be used for this purpose which utilizes the teachings of the present invention to great advantage. As has been indicated hereinabove, it is conventional in synchro type two-speed servo systems to have the coarse portion utilize follow-up devices which are positioned by an output shaft at a first reference rotational velocity and to have the vernier portion utilize a follow-up device at a substantially higher rotational velocity where the ratio of these rotational velocities is determined by the number system and order of significance between the coarse and vernier portions.

In contrast with the prior art, it is the use of the synchro or inductive type follow-up for the high rotational velocity vernier follow-up device in combination with a low rotational velocity coarse follow-up device of the potentiometer type (or equivalent) with which the present invention is concerned. The use of the potentiometer or variable resistive type follow-up in the low rotational velocity coarse portion allows the use of conventional and relatively simple interpolation circuitry for several orders of significance of an input quantity, and the use of an inductive type follow-up in the high rotational velocity vernier portion allows the follow-up device to withstand the high rotational velocities without mechanical wear during the rebalancing of the coarse portion. More specifically, the teachings of the present invention described hereinabove with reference to FIG. 1 allow the inductive or synchro device to be positioned in accordance with two orders of significance of the input quantity, thereby allowing for an overlapping of one order of significance of the input quantity within the coarse and vernier portions for purposes of synchronization therebetween.

Referring again to FIGS. 2 and 3, follow-up potentiometer 52 having a wiper which is positioned directly by output shaft 50 may be used by the coarse control portions for positioning shaft 50 in accordance with the units, tenths and hundredths orders of the digital input information; whereas, synchro 9 having a rotor 11, which is positioned by shaft 50′ through a 1 to 100 rotational velocity step-up gearing 60, may be used to position shaft 50 and load 51 in accordance with the hundredths and thousandths orders of digital input information. By way of example, the position of a zero voltage or ground point along potentiometer 52 is shifted in accordance with the units, tenths and hundredths orders of digital input information by selecting digitally weighted voltages for that purpose by the use of relay circuitry which will be described hereinbelow. As is conventional in two-speed servo systems, the magnitude of the error voltage provided by the coarse selection portion is designed to be greater than the magnitude of the error provided by the vernier high rotational velocity portion until the synchro rotor position is being modified to satisfy the hundredths order of the digital input information and the synchro output voltage is meaningful.

Assuming that wiper 53 of potentiometer 52 is not positioned at the point corresponding to ground, a voltage of a magnitude commensurate with the amount of this deviation and with a phase in accordance with the direction of this deviation will be applied via wiper 53 through emitter-follower 54, diode network 55, and summing resistor 56 to the input of conventional servo amplifier 57. The output of servo amplifier 57 energizes the control winding 58 of a conventional two-phase alternating current motor 59 so as to rotate wiper 53 via shaft 50 to a position corresponding with a zero voltage or ground along potentiometer 52. As is conventional, motor 59 also rotates tachometer generator 61 so as to derive a velocity damping voltage in winding 61 which may be fed back, as shown, to the input of servo amplifier 57 via resistor 63 to provide a conventional damping function. As is conventional, both motor 59 and generator 61 have power or energization windings 65 and 66, respectively, which are connected in parallel to an alternating current power source. Winding 65 also has a phase shifting capacitor 67 in series therewith.

Emitter-follower 54 with its characteristic high input impedance and low output impedance prevents the current flow through the wiper 53 from altering the reflected output impedance of potentiometer 52. Diode network 55 comprises a parallel connection of reversely oriented diodes 68 and 69, each having a forward voltage threshold which is selected in accordance with the minimum voltage level which it is desired that the coarse portion of the digital-to-analog position conversion system respond. Other equivalent means are known which will perform this function.

In order to provide means by which the ground or zero point may be positioned along potentiometer 52 in accordance with the units, tenths and hundredths orders of digital input information, potentiometer 52 is connected in series with secondary 71 of a transformer T1 having a primary 70 connected to an alternating current power source. If the secondary 71 provides a voltage commensurate with 100 volts and one terminal of potentiometer 52 is connected to ground through the closed contacts of normally de-energized relays R20, R21, R22, R23, R24, R25, R26, R27, R28, R29, R30 and R32, as shown, that terminal will be maintained at a ground or zero voltage level. Further, potentiometer 52 will have a voltage equal to 100 volts distributed linearly thereacross. Accordingly, when no digital information is being applied to the digital-to-analog position conversion system, wiper 53 will be driven by the servo follow-up system just described on the way to the left of potentiometer 52.

To provide means for converting binary coded decimal digital input information, binary weighted voltages are made available by providing additional plural windings in the secondary of transformer T1. These secondaries are electrically connected to provide selected voltages between signal ground and the normally grounded terminal of potentiometer 52 in a manner so that the ground or zero voltage point moves toward the other terminal as a linear function of the applied voltage. For example, if a total of 100 volts were applied between ground and the normally grounded end of potentiometer 52, the ground or zero point would move to the other terminal thereof. The conventional coarse servo system described above would then, in response thereto, reposition wiper 53 to the other end of potentiometer 52.

To provide four binary weighted voltages corresponding to the units order of significance into decimal information which may be utilized in converting the binary coded decimal digital information, secondary winding 72 is made equal to 80 volts, secondary winding 73 is made equal to 40 volts, secondary winding 74 is made equal to 20 volts and secondary winding 75 is made equal to 10 volts. In addition, a secondary winding 76 is made equal to 8 volts, a secondary winding 77 is made equal to 4 volts, a secondary winding 78 is made equal to 2 volts, and a secondary winding 79 is made equal to 1 volt, thereby providing four binary weighted voltages which may be utilized in converting the binary coded decimal digital information corresponding to the tenths order of significance into decimal information. Likewise, secondary winding 80 is made equal to .8 volt, secondary winding 81 is made equal to .4 volt, secondary winding 82 is made equal to .2 volt and secondary winding 83 is made equal to .1 volt, thereby providing four binary weighted voltages which may be utilized in converting the binary coded decimal digital information corresponding to the hundredths order of significance into decimal information.

Relays R20, R21, R22 and R23 are appropriately energized in accordance with the binary coded units decimal information. Relays R24, R25, R26 and R27 are appropriately energized in accordance with the binary tenths decimal information. Relays R28, R29, R30 and R32 are appropriately energized in accordance with the binary hundredths digital information. In addition to the relays utilized for the units, tenths and hundredths portions of the binary coded decimal input from additional relays responsive to the binary coded thousandths decimal information are shown. R34, R35, R36 and R37 in their energized states represent decreasing orders of binary significance.

These relays corresponding to the units, tenths, hundredths and thousandths may be appropriately energized by one of several conventional input devices. Conventional card readers or tape readers are exemplary of the input devices referred to.

As explained hereinabove, the zero voltage or ground point along potentiometer 52 may be varied commensurate with the units, tenths and hundredths decimal electrical input information to which it is desired to position load 51 via shaft 50, and, as a result, an error voltage is developed at wiper 53 commensurate therewith. This error voltage is then used to energize motor 59 to move load 51 and reposition wiper 53 to the zero voltage or ground point along potentiometer 52. Referring to FIG. 4, there is shown a plot of the R.M.S. error voltages applied to amplifier 57 versus the error in the linear displacement of load 51 from a position commensurate with the decimal electrical input information. The solid line therein represents the error voltage being supplied to amplifier 57 through summing resistor 56 in accordance with the coarse decimal electrical input, and the dotted sinusoid waveform represents the error voltage from the vernier synchro portion of the two-speed servo being applied to amplifier 57 through summing resistor 64. The derivation of the error voltage from the vernier synchro portion wlil be described in detail hereinafter.

Assuming that the potentiometer 52 is of the single turn type and allowing one turn of wiper 53 through 360° for 10″ of linear travel for load 51, the gearing 60 should be selected so that shaft 50′ connected to rotor 11 of synchro 9 rotates 100 times 360° for each rotation of shaft 50. As a result, one 360° of rotation of shaft 50′ and rotor 11 represents a tenth of the decimal input information, 36° increments of one rotation of shaft 50′ and rotor 11 represent hundredths of the decimal electrical input information and 3.6° increments of rotation of shaft 50′ and rotor 11 represent thousandths of the decimal electrical input information.

Accordingly and following the teachings of the present invention, the stator 10 of synchro differential generator 9 may be selectively energized so that the resultant magnetic field in its windings has ten different orientations provided in 36° increments in accordance with the hundredths order of digital input information. In order to provide this resultant magnetic field with 36° increments in orientation, stator 10 is provided with three Y-connected windings, 12, 13 and 14, angularly displaced by 120° in a conventional manner. One terminal of winding 12 is shown connected to ground, while the other terminals A and B of windings 13 and 14, respectively, are each connected to receive a voltage from a plural tapped, grounded center tap transformer 20 through a relay contact tree to provide for the desired magnetic field which changes its orientation through 360° in 36° increments in accordance with the hundredth order of the decimal input information. By way of example, to provide this resultant magnetic field with incremental orientation changes, terminal A of winding 13 may be energized in accordance with the following equation:

$$E_a = K \cos (\theta_H - 30°) \quad (1)$$

and terminal B of winding 14 may be energized in accordance with the following equation:

$$E_b = K \cos (\theta_H + 30°) \quad (2)$$

Where $\theta_H$ represents the orientation of the resulting magnetic field produced by the stator 10 in 36° increments, 0, 36, 72, etc., and K represents the maximum R.M.S. voltage rating of the synchro stator or less.

Based on an exemplary maximum R.M.S. voltage of 90 volts, the following table may be developed to illustrate the appropriate tapping arrangement and relay contact tree operation necessary to provide 36° increments of the orientation of the resultant magnetic field produced by stator 10 corresponding to hundredths order of the digital input information:

| Hundredths of Digital Input Information | $\theta_H$, degrees | $E_a$, volts | $E_b$, volts |
|---|---|---|---|
| .00 | 0 | 77.94 | 77.94 |
| .01 | 36 | 89.51 | 36.61 |
| .02 | 72 | 66.88 | −18.71 |
| .03 | 108 | 18.71 | −66.88 |
| .04 | 144 | −36.61 | −89.51 |
| .05 | 180 | −77.94 | −77.94 |
| .06 | 216 | −89.51 | −36.61 |
| .07 | 252 | −66.88 | −18.71 |
| .08 | 288 | −18.71 | −66.88 |
| .09 | 324 | 36.61 | 89.51 |

As indicated above, the energization of relays R28, R29, R30 and R32 is determined by the binary coded, hundredth order decimal information in the input. If, according to the binary code used by the conventional input device (not shown) R28, R29, R30 and R32 have a decreasing order of binary significance, a relay contact tree may be developed (similar to that shown in FIG. 3) to appropriately select the taps of the secondary of transformer 20 and provide for the desired energization of terminal A of winding 13 and terminal B of winding 14 of stator 10 by reference to a tabulation similar to that set forth above.

By way of example, if the hundredths portion of the binary coded decimal input information were equal to .06 inch, relays R29 and R30 would be energized and contacts R29*b*, R29*c*, R30*b*, R30*c*, R30*d*, R30*e*, R30*f*, R30*g* and R30*h* in the secondary of transformer 20 would be switched from the position shown. As a result, terminal A of winding 13 receives a voltage equal to −66.88 volts, while terminal B of winding 14 receives a voltage equal to −36.61 volts. According to the tabulation set forth above, this would correspond to an orientation of the resultant magnetic field produced by stator 10 commensurate with .06 inch of the decimal input information, or six 36° incremental orientation changes for the resultant magnetic field from a reference totaling 216°.

From the above, it should be noted that in deriving the desired voltages at terminals A and B of the stator 10 for providing a resultant magnetic field with various angular orientations of 36° increments the taps provided on the secondary of transformer 20 are used more than once. In contrast to the prior art, the interpolation to provide for 3.6° increments commensurate with the thousandths binary coded decimal input information is provided by placing a multi-tap potentiometer across the extremities of two windings of the rotor 11 in a manner which will be described hereinafter. This results in considerable circuit simplicity which would not be present if, according to prior art techniques, interpolation were attempted between the 36° taps to provide 3.6° increments commensurate with the thousandths binary coded decimal electrical input information.

As shown in FIG. 3, rotor 11 has three Y-connected windings, 15, 16 and 18, each angularly displaced by 120°. One terminal of winding 15 is shown connected to ground. Terminal Y of winding 17 is shown connected to ground through balancing resistor 65, and terminal X of winding 16 is connected to ground through balancing resistor 66. Also connected between terminals X and Y is plural tapped potentiometer 67 for the purpose of illustrating the novel interpolation technique according to the teachings of the present invention. As shown, potentiometer 67 comprises plural resistances 67, 68, 69, 70, 71, 72, 73, 74, 75, 76, 77, each having a selective resistance value in accordance with the interpolation technique of the present invention.

Assume that the stator windings 13 and 14 energized as described above cooperate to generate a resultant magnetic field oriented in accordance with the hundredths order of decimal input information, and that shaft 50 has been previously positioned by the units and tenths orders of decimal input information so that the error voltage derived by coarse potentiometer 52 no longed exceeds the voltage threshold of voltage limiting circuit 55, the error voltage depicted by a solid line in FIG. 4 approaches zero, as shown. Moreover, assume that shaft 50' connected to rotor 11 is not angularly positioned in accordance with the particular 36° increment selected by the hundredths order of decimal input information and as a result the resultant magnetic field produced by the stator windings induces a voltage at terminal X with respect to ground in rotor winding 16, this voltage is then applied through the normally closed contacts shown to energize amplifier 57 through summing resistor 64. Summing amplifier 57 then energizes motor 59 so as to rotate rotor 11 through shafts 50 and 50' and gearing 60 so as to null out the voltage at terminal X of winding 16.

Although winding 16 was selected herein to provide a voltage output directly to amplifier 57 in accordance with the hundredths order of decimal input information, winding 17 could also have been selected for that purpose depending upon the desired zero calibration of the disclosed system.

The voltage induced in windings 16 and 17 of the rotor are related and this relationship provides a basis for locating the interpolation in cooperation with the rotor windings in accordance with the present invention. As will be recognized by those skilled in the art, this voltage relationship may be represented trigonometrically and the voltage at terminal X may be shown by the following equation:

$$E_x = K \text{ Sin } (\theta_T) \quad (3)$$

and the voltage at terminal Y may be shown by the following equation:

$$E_y = K \text{ Sin } (\theta_T - 60°) \quad (4)$$

Where $\theta_T$=the angle between the resultant magnetic field produced by the stator windings and the angular position of rotor 11 where a zero voltage is induced in winding 16 at terminal X with respect to ground, and K=a constant determined by the magnitude of the voltages applied to terminals A and B of the stator and the transformer ratio of the synchro.

Referring now to FIG. 5, there is shown a plot of the voltages with respect to ground appearing at terminals X and Y of rotor 11, respectively, and defined by Equations 3 and 4. As described above and shown in FIG. 5, the voltages with respect to ground at terminals X and Y vary sinusoidally as $\theta_T$ is increased.

When a tapped potentiometer comprising plural resistances 67, 68, 69, 70, 71, 72, 73, 74, 75, 76, and 77 is placed across terminals X and Y means are provided for interpolating between 36° increments corresponding to 3.6° increments in accordance with the thousandths order of the decimal input information. FIG. 5 shows these 3.6° increments and illustrates the relative magnitudes of the voltages at terminals X and Y respectively, as the rotor moves through $\theta_T$. As shown, the ratio of the voltage at terminal X with respect to terminal Y will vary with $\theta_T$ in a manner corresponding to $$\frac{\text{Sin } \theta_T}{(\text{Sin } \theta)+\cos (30+\theta_T)}$$

To provide the desired interpolation in 3.6° increments, the resistance values between the taps can be calculated with reference to the total resistance therebetween in accordance with this ratio. Then, the voltages at the taps placed at the junction of these resistances may be utilized to derive voltages equal to the 3.6° increments. Further, these 3.6° increments may be labelled, as shown, in terms of thousandths of the decimal input information. When the relay contact tree shown is actuated by the binary weighted relays R34, R35, R36 and R37, the selected thousandths order decimal tap is connected to the input of amplifier 57 so that motor 59 may be energized to rotate shaft 50' and rotor 11 through the number of 3.6° increments represented by the tap selected.

By way of example, suppose the thousandths order binary coded decimal input information was commensurate with .006 inch in defining the linear position of load 51. Relays R35 and R36 would be energized and summing resistor 64 would be connected to the tap commensurate with .006 inch through relay contacts **R35*a* and R37*c* which are switched from the position shown. Rotor 11 is then rotated by motor 59 in accordance with the voltage at the selected tap until the voltage of the selected tap with respect to ground is nulled out by the modification of the voltage at terminals X and Y of windings 16 and 17**, respectively.

Numerous modifications may be made to the disclosed embodiment of the present invention which will be within the teachings thereof. For example, referring to FIG. 3, if it was desired to provide for a resolution of .0001 of an inch, the tapped potentiometer comprising resistances 68, 69, 70, 71, etc. is sufficiently linear to provide for interpolation between each pair of taps by the addition of two more relay contact trees and an additional tapped potentiometer. Moreover, the tapped potentiometer shown in FIG. 3 could well have been designed as a tapped transformer by utilizing the teachings of the present invention. Even though the inductive follow-up device is shown as a synchro differential, it could have been any of the well known types exemplified by a resolver or an INDUCTOSYN of the type manufactured by Farrand Controls, Inc., 4401 Bronx Boulevard, New York 70, New York.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A digital-to-analog shaft converter comprising means for providing an electrical digital input of at least two orders of significance, an inductive device comprising a stator and a rotor with windings on each, means for energizing said stator windings in a manner such as to magnetically define the analog of the higher order of said digital input for inducing voltages in the rotor windings in accordance therewith, means connected to said rotor windings for modifying the voltages induced in said rotor windings in accordance with the lower order of significance of said digital input.

2. A digital-to-analog shaft converter comprising means for providing an electrical digital input of N orders of significance, an inductive device comprising a stator and a rotor with windings on each, means for energizing said stator windings in a manner so as to magnetically define the analog of the N order of said digital input for inducing voltages in the rotor windings in accordance therewith, means connected to said rotor windings modifying the voltages induced in the rotor windings in accordance with the N–1 order of significance of said digital input.

3. A digital-to-analog shaft converter comprising means for providing an electrical decimal digital input, a load, means connected to said rotor windings for selecting an analog voltage commensurate with all but the lowest order information of said decimal digital input, a follow-up voltage deriving means, a servo amplifier responsive to the algebraic sum of said coarse analog and follow-up voltages, a reversible electrical motor responsive to said amplifier for positioning a first low rotational velocity output shaft in accordance therewith, said follow-up voltage being derived in accordance with the position of said first output shaft, a first relay contact tree responsive to next to the lowest order of information of said decimal digital input, a plural tapped transformer disposed so that two of its taps may be simultaneously selected by said second relay contact tree to provide two analog voltages cooperating in magnitude and phase for electrically defining said next to the lowest order decimal digital input, a synchro differential comprising a stator, a rotor, said rotor and stator each having three windings angularly displaced by 120° mounted thereon, two windings of said stator being responsive to said analog voltages appearing at said two selected transformer taps with the other of said stator windings being connected to ground, a tapped potentiometer connected across two windings of said rotor with the other winding of said rotor being connected to ground, the voltage output from said rotor being taken from the output of said potentiometer, a second relay contact tree responsive to the lowest order information of said decimal digital input for modifying the output of said potentiometer in accordance therewith, said servo amplifier and motor being connected to also be responsive to the voltage output of said potentiometer, said rotor being positioned by said motor via a second high rotational velocity shaft to null out the voltage output of said potentiometer, said motor also positioning said load in accordance with said decimal digital input.

4. A digital-to-analog shaft converter comprising means for providing an electrical decimal digital input, a load, means for selecting an analog voltage commensurate with all but the lowest order information of said decimal digital input, a follow-up voltage deriving means, a servo amplifier responsive to the algebraic sum of aid coarse analog and follow-up voltages, a reversible electrical motor responsive to said amplifier for positioning a first low rotational velocity output shaft in accordance therewith, said follow-up voltage being derived in accordance with the position of said first output shaft, a first relay contact tree responsive to next to the lowest order of information of said decimal digital input, a voltage deriving means responsive to said relay contact tree for providing two analog voltages cooperating in magnitude and phase to electrically define said next to the lowest order decimal digit input, an inductive device comprising a stator and rotor with windings on each, said stator windings being energized by said two analog voltages for inducing voltages in the rotor windings in accordance therewith, a tapped potentiometer connected across two windings of said rotor with the other winding of said rotor being connected to ground, the voltage output from said rotor being taken from the output of said potentiometer, a second relay contact tree responsive to the lowest order information of said decimal digital input for modifying the output of said potentiometer in accordance therewith, said servo amplifier and motor being connected to also be responsive to the voltage output of said potentiometer, said rotor being positioned by said motor via a second high rotational velocity shaft to null out the voltage output of said potentiometer, said motor also positioning said load in accordance with said decimal digital input.

5. A digital-to-analog shaft converter comprising means for providing an electrical digital input, a plural tap transformer, a first relay contact tree responsive to the N order information of said digital input having two output terminals for selectively switching to any two taps of said plural tap transformer for providing two analog voltages cooperating in magnitude and phase for electrically defining the N order decimal digital input, a synchro differential generator comprising a stator, a rotor, three windings angularly displaced by 120° mounted on said rotor and said stator, two windings of said stator being responsive to said two analog voltages appearing on said two outputs for producing a magnetic field having an orientation which is commensurate with the N order of significance of said digital input and the other of said stator windings being connected to ground, a potentiometer connected to be responsive to two windings of said rotor and the other winding of said rotor being connected to ground, a second relay contact tree responsive to the N–1 order of said digital input for positioning the output of said potentiometer thereon, an amplifier connected to be responsive to the output of said potentiometer, a reversible electrical motor responsive to said amplifier output for positioning said rotor in accordance therewith so as to null out the voltage applied thereto, said rotor being positioned in accordance with said digital input.

6. A digital-to-analog converter comprising means for providing an electrical digital input, a plural tap transformer, a first relay contact tree responsive to the N order information of said digital input having two output terminals for selectively switching to any two taps of said plural tapped transformer for providing two analog voltages cooperating in magnitude and phase for electrically defining the N order digital input, an inductive device comprising a stator, a rotor and plural windings mounted on each said rotor and said stator, two windings of said stator being responsive to said two analog voltages appearing at said two selected taps for producing a magnetic field having an orientation which is commensurate with the N order digital input, a potentiometer connected to be responsive to two windings of said rotor, a second relay contact tree responsive to the N–1 order information from said digital input for modifying the output of said potentiometer, an amplifier connected to be responsive to the output of said potentiometer, and a reversible electric motor responsive to said amplifier output for positioning said rotor to null out the output voltage of said potentiometer.

7. A digital-to-analog converter comprising means for providing an electrical digital input, a plural output terminal voltage device, a first selective means responsive to the N order information of said digital input having two output terminals for selectively switching to any two terminals of said plural terminal voltage device for providing two analog voltages cooperating in magnitude and phase for electrically defining the N order digital input, an inductive device comprising a primary and a movable secondary with windings on said secondary and windings mounted on said primary, said windings on said primary being responsive to said analog voltages appearing at said selected terminals for producing a magnetic field having an orientation which is commensurate with the N order digital input, a potentiometer connected to be responsive to windings on said secondary, a second relay contact tree responsive to the N–1 order information from said digital input for positioning the output of said potentiometer, an amplifier connected to be responsive to the output of said amplifier, and a reversible motor responsive to said amplifier for positioning said secondary to null the output voltage of said potentiometer.

References Cited in the file of this patent

UNITED STATES PATENTS

| | | |
|---|---|---|
| 2,605,450 | Nettleton | July 29, 1952 |
| 2,803,003 | Pfeiffer | Aug. 13, 1957 |
| 2,814,006 | Wilde | Nov. 19, 1957 |

UNITED STATES PATENT OFFICE
CERTIFICATE OF CORRECTION

Patent No. 3,039,030 June 12, 1962

Ralph J. Weidner

It is hereby certified that error appears in the above numbered patent requiring correction and that the said Letters Patent should read as corrected below.

Column 10, line 15, strike out "connected to said rotor windings"; line 55, for "aid" read -- said --.

Signed and sealed this 30th day of October 1962.

(SEAL)
Attest:

ERNEST W. SWIDER
Attesting Officer

DAVID L. LADD
Commissioner of Patents